UNITED STATES PATENT OFFICE.

ILLIUS AUGUSTUS TIMMIS, OF LONDON, ENGLAND.

PROCESS OF MAKING MEAT FOODS.

SPECIFICATION forming part of Letters Patent No. 643,567, dated February 13, 1900.

Application filed November 25, 1898. Serial No. 697,448. (No specimens.)

*To all whom it may concern:*

Be it known that I, ILLIUS AUGUSTUS TIMMIS, a subject of the Queen of Great Britain, residing at London, in the county of Middlesex, England, have invented certain new and useful Improvements in the Manufacture of Meat Food; and I do hereby declare the following to be a full, clear, and exact description of the invention, such as will enable others skilled in the art to which it appertains to make and use the same.

The object of my invention is to produce new preparations of animal food from the whole carcass of beast, bird, or fish which shall contain the maximum of nutriment and be easily digested and assimilated. There are practically two preparations—one, an extract which is prepared and sold in liquid or semiliquid forms and the other a solid or edible food.

It is well known that the reference-books on chemistry give 70° centigrade as the coagulation-point of albumen; but I have proved after many months of work that this is wrong and that it is necessary in order to get the albumenoid and coagulating bodies out of meat, bone, and sinew to work at 50° centigrade or close on that heat—say not exceeding 55° centigrade; but it is also necessary after having extracted the coagulating bodies to subject the meat, bone, and sinew to a further operation at 100° centigrade, or, say, boiling-point, to extract the soluble phosphates and salts.

In making thick soup, having ground a carcass or part of it in any suitable machinery to a sufficient fineness and mixed with sufficient water to heat it to a temperature of 50° centigrade or thereabout for sufficient time— say about one hour—I then draw off by any suitable means (I prefer to use a centrifugal machine for several reasons) the liquor which contains all the coagulating bodies, such as the albumenoids. I then remix the ground material with more water and heat it to boiling-point for a considerably longer time than before and extract from it the soluble salts and phosphates. This liquor I also extract, as before described, and I then mix the two liquors together. This liquor I call the "double-temperature" liquor, and I prefer that the quantity of it is so regulated that one pint of it is the product of one pound of ground meat, bone, and sinew. Into this liquor I put a small quantity of very fine flour, just sufficient to make a thick or cloudy liquor. This latter product I put into bottles or tins or such vessels as I am using and sterilize it by the usual means. The addition of the fine flour causes the coagulating bodies when the sterilizing heat is applied to coagulate or precipitate in exceedingly fine particles, and thus a homogeneous thick soup is obtained.

The extraction of the albumenoid and coagulating bodies at 50° centigrade is a new invention, and their precipitation under heat by the addition of fine flour before coagulation is also a new invention.

In making clear soup I produce the double-temperature liquor, as above described, and then subject it to, say, 100° centigrade heat and precipitate the coagulating bodies. I then strain off the clear liquor, which is clear soup. The coagulated residue is a new product not produced before. The clear soup I put into suitable bottles or other vessels and sterilize it in the usual way.

In making essence I take the clear soup and reduce it to any required consistency by evaporation and sterilize it in suitable tins or other vessels.

In making albumenoid paste I take the coagulated residue from clear soup (described above) and put it into tins or other suitable vessels and sterilize it in the usual way.

The above products may have vegetables and condiments added, if required.

In making solid or edible meat foods I proceed as follows: I first cut off the meat and cut or grind it up to a suitable fineness. I then grind up the bone and sinew and extract from them at the two temperatures, as above described, the double-temperature liquid. This liquor I reduce to a jelly by evaporation and then mix it with the ground meat. This is a completely new food and when mixed with vegetables, such as lentils and condiments, is a complete as well as a new food.

Having described my invention, I claim—

1. In the preparation of food products, the process of extracting and separating the edible constituents from beast, bird or fish, which consists in grinding a portion of a carcass containing albumenoids and soluble salts, and including the bone and sinew to a finely-divided condition, mixing the same with water and heating the mixture to a temperature of about 50° centigrade, and maintaining it at such heat until the coagulating bodies are extracted, without coagulating, then drawing off or straining the liquid containing such bodies from the solid mass, then remixing the ground material with water and subjecting it to a heat of about 100° centigrade and extracting the soluble salts, and then separating the liquid so obtained from the solid mass and mixing or combining it with the liquor first extracted and separated.

2. In the preparation of food products, the process of extracting, separating and preparing for use, the edible constituents of beast bird or fish, which consists in grinding a portion of the carcass, containing the bones and sinews to a finely-divided condition, mixing the same with water, heating the mixture to about 50° centigrade and under such heat extracting the coagulable bodies, separating the liquid containing such bodies from the mass, remixing the latter with water and subjecting it to a temperature of about 100° centigrade to extract the phosphates and soluble salts, separating the liquid containing such salts from the mass, mixing the two liquids together, and evaporating to a jelly-like consistency and then combining the jellied product with meat.

3. The method of preparing meat food, which consists in separating the meat from the bone and sinew grinding the bone and sinew to a fine condition, mixing them with water extracting the coagulable bodies at a temperature of about 50°, centigrade, separating the liquid from the mass, adding water to the latter, extracting the soluble salts at a temperature of about 100°, centigrade, separating the liquid from the mass, combining the two liquids, evaporating the same to a jelly-like consistency and then mixing the jelly with the meat previously separated from the bone and sinew.

In testimony whereof I have affixed my signature in presence of two witnesses.

ILLIUS AUGUSTUS TIMMIS.

Witnesses:
  CHAS. ROCHE,
  B. PHILLIPS.